United States Patent Office 2,739,059
Patented Mar. 20, 1956

2,739,059

MODIFICATION OF HYDROXYL CONTAINING POLYVINYL RESIN TREATED WITH AN AMINO ACETAL AS A SILVER HALIDE BINDER

William J. Priest and Charles F. H. Allen, Rochester, N. Y., assignors to Eastman Kodak Company, Rochester, N. Y., a corporation of New Jersey No Drawing. Application August 12, 1952, Serial No. 303,996

2 Claims. (Cl. 95—7)

This invention relates to a process and product involving modification of a hydroxyl containing polyvinyl resin such as polyvinyl alcohol or a substantially hydrolyzed polyvinyl acetate by treatment with an amino acetal, the result apparently being the introduction of substituent amino groups attached to the polyvinyl compound through cyclic acetal linkages. The modified polymers are particularly useful in applications where gelatin has previously been used, such as in carriers for light sensitive substances in the photographic art.

It is known that vinyl acetate polymerized to polyvinyl acetate may be hydrolyzed to polyvinyl alcohol which may be used as an intermediate in forming various polyvinyl resins. Some of these resins have gelatin-like qualities and may be substituted for gelatin as a carrier for light-sensitive silver salts and the like in photographic film. One of these resins, which has an affinity for acid dyestuffs, can be formed by the action of a halogen alkylamine, for example, bromethylamine on polyvinyl alcohol. Another which can be used to provide photographic elements with layers composed of gelled hydroxyl polymer compounds is produced by treating the polyvinyl alcohol with an aqueous solution containing an acylacetamide.

We have now found that a new resinous polymer is formed by modifying a hydroxyl containing polyvinyl resin such as polyvinyl alcohol or substantially hydrolyzed polyvinyl acetate by treatment with an amino acetal, which apparently results in the introduction of substituent amino groups. By amino acetal is meant an acetal formed by the reaction of an amino aldehyde with an alcohol. The amino groups are thought to be attached to the polyvinyl alcohol through cyclic acetal linkages. Unlike unmodified polyvinyl alcohol, the products obtained according to this invention are capable of being hardened or rendered less water susceptible by treatment with a variety of substances such as aldehydes (e. g., formaldehyde), customarily used as tanning agents for water-soluble proteins such as gelatin. They may likewise be mixed with polyvinyl alcohol not containing amino groups and the whole composition hardened by treatment with aldehydes and like substances. Compounds or materials capable of liberating formaldehyde or an additive or derivative compound or polymer of formaldehyde, capable of being dissolved to form a hardening solution may be used. Examples of such compounds are formaldehyde bisulfite, hexamethylene tetramine, trioxymethylene, paraform, paraformaldehyde, and polyoxymethylene. If the gelatin hardening solution is to be compounded for immediate use rather than being packaged for future use, liquid hardening agents, such as acetyl benzoyl, acetyl caproyl, diacetyl, dibenzoyl, acetaldehyde, 2,3-butanedione, dichloroacetone, diketobutane, dimethyl diketone, dimethyl glyoxal, formylacrylic acid, furfural, glyceryl aldehyde, glycol aldehyde, glyoxylic acid, hydrofuramide, monochloroacetone, para-oxybenzoyl carbinol, or tartaric dialdehyde have been employed.

It is, accordingly, an object of our invention to provide a new process and product involving the treatment of a hydroxyl containing polyvinyl resin such as polyvinyl alcohol or hydrolyzed polyvinyl acetate with an amino acetal. A further object of the invention is to provide a gelatin substitute which may be used in the photographic and other arts, as for making a photographic emulsion containing light-sensitive material such as silver salts. Another object is to provide a new photographic element comprising a gel made up of amino acetal treated polyvinyl alcohol or hydrolyzed polyvinyl acetate and carrying a light-sensitive substance. Another object of the invention is to provide a tough clear transparent film which may be readily hardened or rendered less water susceptible.

In accordance with our invention, we prepare our new class of polymers by modifying a hydroxyl containing polyvinyl resin such as polyvinyl alcohol or a substantially hydrolyzed polyvinyl acetate by treatment with an amino acetal, which apparently results in the introduction of substituent amino groups. The reaction is preferably carried out in water under acid conditions where all of the components are water-soluble. In practice, the reaction is employed in such a way that only a relatively few of the hydroxyl groups on the polyvinyl alcohol groups are converted by reaction with the amino acetal.

One of the amino acetals which may be employed to achieve the objectives of this invention is $\beta$-amino diethyl acetal, but this is merely representative of the class of such compounds which are useful in the practice of the invention. While the temperature of reaction and the acidity may be varied within certain limits, excessively high temperatures, say in the range of 100° C. and above lead to poor color in the polymer, presumably due to side reactions not important at lower temperatures.

The following examples are given merely in an illustrative sense and the invention is not to be considered as restricted thereto.

Example—Modification of polyvinyl alcohol by $\beta$-amino diethyl acetal

Seventeen parts of polyvinyl alcohol made from polyvinyl acetate having a viscosity of 22 centipoises/molar solution with benzene, were dissolved in 158 parts water. To this were added 175 parts 1-Normal hydrochloric acid, and 5.26 parts $\beta$-amino diethyl acetal. After withdrawal of a portion of the reaction mixture as a control, the balance was heated at 58° C. Samples were withdrawn for analysis at various times thereafter. The polymers in these samples were isolated by precipitation in ethyl alcohol followed by redissolution in water and a second precipitation in acetone. Known weights of the products were titrated electrometrically to determine the amount of amino nitrogen and total nitrogen was determined by elemental analysis. The following table shows the results of the analyses:

| Sample | Time of Heating at 58° C. (Hrs.) | Percent (wt.) amino N found by titration | Percent (wt.) N (total) |
|---|---|---|---|
| A (control) | 0 | .14 | .2 |
| B | 2½ | .225 | .2 |
| C | 5¼ | .36 | .3 |
| D | 8 | .60 | .5 |
| E | 24 | .90 | 1.0 |
| F | 48 | 1.17 | 1.2 |

The solubility of the polymers obtained became progressively greater in organic solvents such as alcohols as the N content increased.

Although we do not wish to be bound by any theory of operation of the invention, we believe that the reaction takes place as follows:

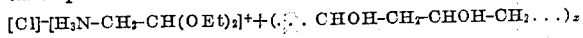

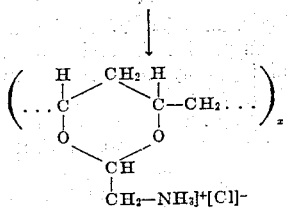

where . . . CHOH—CH₂—CHOH—CH₂ . . . represents a portion of a long chain polyvinyl alcohol.

The following example illustrates how a polyvinyl alcohol partially substituted with amino acetal groups may be rendered insoluble in water at elevated temperatures.

A partial amino acetal of polyvinyl alcohol of the type disclosed in Example 1 containing .6% amino nitrogen was dissolved in water to make a 5% (wt.) solution. Twenty parts of this solution were mixed with one part of 5% formaldehyde. The mixture was adjusted to pH 7 with dilute sodium hydroxide and one part of a buffer at pH 7 was added. This composition was coated in a thin film on a glass plate. After drying and curing at room temperature for two and one-half days, the resultant foil was not dissolved or disintegrated by water at 100° C.

The polyvinyl resins prepared in accordance with our invention are valuable substitutes for gelatin in the production of photographic emulsions and films. Tough, homogeneous films can be provided which are useful for example, as carriers for light-sensitive materials such as silver salts. Gelatin used widely in the prior art for this purpose is obtained from animal matter and is subject to variation in its chemical composition. Consequently, great care and expense must be invested to purify gelatin used in the photographic art as in emulsions to avoid deleterious effects on the light sensitive materials used therewith. Use of the compositions we have invented provides greater control over the carrier of the light sensitive material and enables production of film at a lower cost. For this reason, our invention has great utility and special advantage in the photographic industry. However, it also provides resins useful in other arts requiring substances having the properties of our modified polyvinyl polymers.

We claim as our invention:

1. A photographic element comprising polyvinyl alcohol modified by reacting with β-amino diethyl acetal and containing a light-sensitive silver halide salt.

2. A process for forming a photographic element comprising modifying polyvinyl alcohol by dissolving the polyvinyl alcohol in water, adjusting this solution to a pH of about 0.7 by the addition of hydrochloric acid, and subjecting the solution to prolonged heating with β-amino diethyl acetal at a temperature below about 100° C. and adding to the resulting modified polyvinyl alcohol light-sensitive silver halide salts.

References Cited in the file of this patent

UNITED STATES PATENTS

| | | |
|---|---|---|
| 2,276,322 | Lowe | Mar. 17, 1942 |
| 2,310,943 | Dorough | Feb. 16, 1943 |
| 2,320,422 | Frohlich | June 1, 1943 |
| 2,481,434 | McQueen et al. | Sept. 6, 1949 |
| 2,518,704 | Martin | Aug. 15, 1950 |

FOREIGN PATENTS

| | | |
|---|---|---|
| 526,497 | Germany | Sept. 25, 1933 |
| 509,012 | Great Britain | July 6, 1939 |